Aug. 6, 1957     O. A. SWENSON     2,801,539

TORQUE GAUGE

Filed Feb. 24, 1955

Otto A. Swenson
INVENTOR.

BY *Clarence A. O'Brien*
*and Harvey B. Jackson*
Attorneys

United States Patent Office 2,801,539
Patented Aug. 6, 1957

2,801,539

TORQUE GAUGE

Otto A. Swenson, Eunice, La.

Application February 24, 1955, Serial No. 490,291

2 Claims. (Cl. 73—139)

The present invention relates to a system and apparatus for measuring torque.

In the drilling of oil wells and the like, drill rod sections, casings, tubing, pipe, etc., are screwed together through the medium of screw threaded joints as they are run into the well. In coupling and uncoupling the tubing or rod sections, it is often necessary to apply severe twisting stresses to the sections, and consequently power driven equipment is commonly used in the making or breaking of the joints of the sections. Inasmuch as the sections may be subjected with safety to only a limited torsion, it is customary to measure effective torsional force applied to the rod, tubing or pipe so that the effective safety limit will not be over-reached in making or breaking the joints which would otherwise develop trouble within the well.

However, under the existing processes, ordinary torque gauge readings must be corrected in order to obtain the measure of true torque by triangulation, in other words by taking the actual torque gauge reading as the hypotenusal leg of a triangle when computing the perpendicular distance from the lever arm of the work engaging tongs of the equipment and its included angle with respect thereto.

The primary object of the present invention is to provide an apparatus and system for enabling a conventional torque gauge to give a true, effective force reading of the torsion applied to the pipe by the work engaging tongs as twisting stresses are applied thereto in the coupling and uncoupling of pipe sections.

Another object of the invention, ancillary to the preceding object, is in the provision of a system for taking direct readings from a torque gauge in the application of twisting stresses to drill pipes and the like whereby to eliminate the necessity for allowances for the sizes and shapes of various rig floors, derrick leg deviations, the angle of the back-up line from the lever arm, etc.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
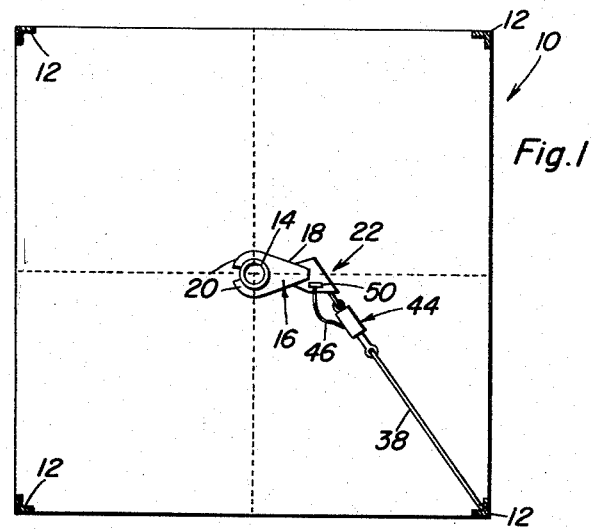
Figure 1 is a top elevational view of pipe tongs with the apparatus constituting the present invention attached thereto.
Figure 2:
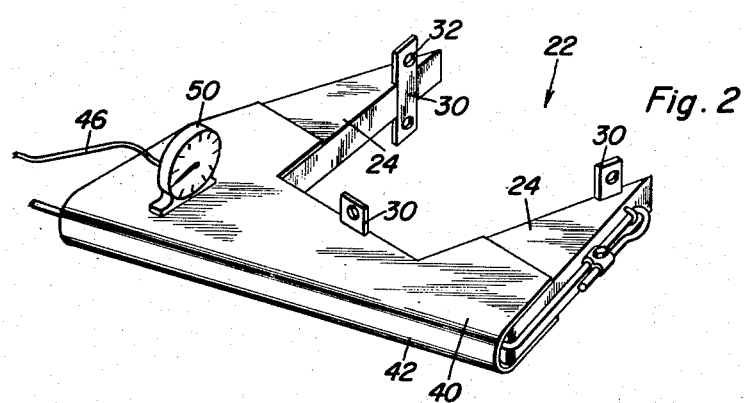
Figure 2 is a perspective view of an angle adapter constituting a major portion of the present invention.
Figure 3:
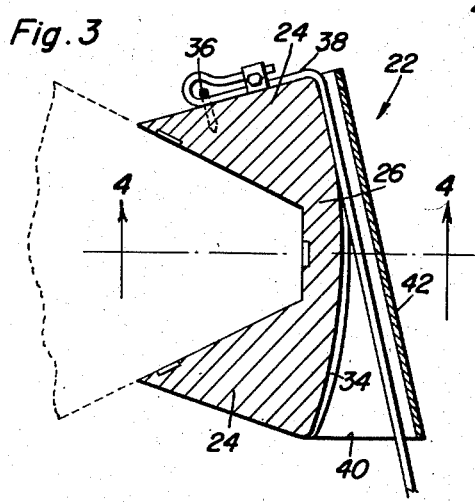
Figure 3 is a longitudinal cross sectional view through the angle adapter as applied to a pipe grasping tong.
Figure 4:
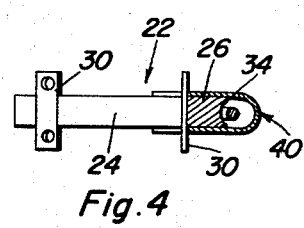
Figure 4 is a horizontal cross sectional view through the angle adapter as applied to the tong taken substantially along the plane of section line 4—4 of Figure 3.

In the drawings, there is shown in Figure 1 an essentially diagrammatic showing of a derrick 10 including corner legs 12. A section of piping, tubing, drill rod or the like 14 is shown centrally of the derrick as it is being run into or out of the wall.

A pipe engaging tong 16 clasps the tubing 14 thereto. The tong is of a conventional nature and has a lever arm section 18 extending from the jaws 20 thereof.

Attached to the end of the lever arm 18 of the tongs 16 is an angle adapter 22, the provision of which in conjunction with other elements to be described hereinafter, constitutes the present invention.

The angle adapter is basically in the form of a C-clamp consisting of legs 24 and a bight section 26 interconnecting the legs and being shaped to fit over the ends of the tongs 16.

Brackets or plates 30 fixed to the facing surfaces of the legs 24 in the inside edge of the bight portion 26 of the adapter 22 securely fasten the adapter by virtue of suitable fasteners passed through the apertures 32 therein to the end of the tongs 16.

The outer edge of the bight portion 26 of the adapter 22 is curved in the form of an arc of a circle. In addition, this arcuate surface is grooved to form a cable guide.

To the outer surface of one of the legs 24 of the adapter 22 is secured an anchoring eye 36 or the like for anchoring one end of the cable 38 thereto. The cable is entrained over the arcuate, grooved outer surface 34 of the bight portion 26 of the angle adapter 22.

A cable shield 40 overlies the bight portion 26 of the adapter 22, the length of the bight portion 42 of the cable shield being straight, spaced from and generally tangential with the end of the arc 34 adjacent the cable anchoring eye 36.

Thus, as the back-up line or cable 38 is pulled to exert a twisting stress on the tongs 16, whether or not the back-up line is in tangential engagement only with some portion of the grooved curvature 34 of the end of the angle adapter 22 can easily be judged by its position as it extends from the limit guard or cable shield 40.

Force sensing means in the form of a hydraulic cylinder and piston 44 is provided on the back-up line 38 and the fluid line 46 connects this hydraulic mechanism with a suitable torque gauge 50.

The curved outer edge 34 of the angle adapter 22 is struck from the same radius as that for which the torque gauge 50 is calibrated. Consequently, so long as the back-up line 38 contacts this arc, the gauge readings will be the actual effective force applied to the pipe.

Although in the illustrated embodiment, the angle adapter will cover only a variation in the position of the back-up line of approximately 30°, a curved outer edge of the adapter 22 can be formed to cover approximately up to 300° of a circle and yet give a true effective reading to the torque gauge of the effective force applied to the pipe being made up.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed as new is as follows:

1. An adapter for mounting on the end of the lever arm of a tong which is adapted to engage a section of pipe, tubing, rod and the like, said adapter comprising a generally U-shaped body which includes a pair of diverging legs and a cross member, said legs being adapted to fit against diverging sides of said lever arm, said cross member having a grooved end curved to form an arc whose center is at the axis of the pipe, tubing, rod and the like, a cable secured to said body and reeved over said grooved end of said body for tangential movement therefrom throughout the length of the arc, force sensing means connected to said cable, a torque gauge operatively connected to said force sensing means, the same radius being utilized in the calibration of said gauge as that utilized in forming said arc of said grooved end of said body, and a cable shield over said grooved end of said body and a part of said cable.

2. An adapter for mounting on the end of the lever arm of a tong which is adapted to connect to a pipe, tubing, rod and the like, said adapter comprising a body which includes a pair of legs between which said lever arm is adapted to fit, brackets carried by said legs and adapted to be attached to said lever arm, said adapter body having a grooved end which is curved to form an arc of a circle about the axis of the pipe, tubing, rod and the like, a cable attached to said body and reeved over said grooved end for tangential movement therefrom throughout the length of the arc, force sensing means connected to said cable, a torque gauge operatively connected to said force sensing means, the same radius being utilized in the calibration of said gauge as that utilized in forming said arc of said grooved end, a cable shield over said grooved end of said body and a part of said cable, said shield having an edge disposed between said legs of said body, and a mounting bracket carried by said body at said edge and adapted to be secured to said lever arm.

References Cited in the file of this patent

UNITED STATES PATENTS

| | | |
|---|---|---|
| 1,080,937 | Stephens | Dec. 9, 1913 |
| 2,272,610 | Kreiger | Feb. 10, 1942 |
| 2,492,470 | Farkas | Dec. 27, 1949 |
| 2,527,456 | Schmeling | Oct. 24, 1950 |